US006683123B1

(12) United States Patent
Kozlowski

(10) Patent No.: US 6,683,123 B1
(45) Date of Patent: Jan. 27, 2004

(54) PROCESS FOR MAKING A THERMOPLASTIC MOLDING COMPOSITION

(75) Inventor: Henry A. Kozlowski, Auburn, MA (US)

(73) Assignee: Bayer Polymers LLC, Pittsburgh, PA (US)

( * ) Notice: Subject to any disclaimer, the term of this patent is extended or adjusted under 35 U.S.C. 154(b) by 154 days.

(21) Appl. No.: 09/659,281

(22) Filed: Sep. 12, 2000

(51) Int. Cl.$^7$ .............................. C08F 6/24; C08L 53/00; C08L 53/02; C08L 55/02
(52) U.S. Cl. ..................... 523/309; 264/204; 523/336; 523/351; 525/95; 525/243
(58) Field of Search ........................... 516/31; 523/309, 523/336, 351; 260/DIG. 4; 526/935; 264/204; 525/95, 243

(56) References Cited

U.S. PATENT DOCUMENTS

| | | | |
|---|---|---|---|
| 3,299,186 A | | 1/1967 | Wallace |
| 4,698,378 A | * | 10/1987 | Wehrli et al. ............ 523/309 X |
| 5,244,943 A | * | 9/1993 | Oyama et al. ............... 523/336 |
| 5,268,399 A | * | 12/1993 | Wouters et al. ............. 523/336 |
| 5,317,035 A | * | 5/1994 | Jacoby et al. ............. 525/95 X |
| 5,336,701 A | | 8/1994 | Wildi et al. ................. 590/411 |
| 5,354,804 A | | 10/1994 | Inada et al. ................. 524/503 |
| 5,521,231 A | * | 5/1996 | Suzuki et al. ............ 523/309 X |
| 5,753,169 A | | 5/1998 | Kaito et al. ............. 264/211.19 |
| 5,786,445 A | * | 7/1998 | Wulff et al. ............. 264/204 X |
| 5,872,164 A | * | 2/1999 | Koide et al. ............. 523/351 X |
| 6,300,401 B1 | * | 10/2001 | Fujii et al. ............... 523/351 X |
| 6,333,381 B1 | * | 12/2001 | Asada et al. ............. 525/243 X |
| 6,441,090 B1 | * | 8/2002 | Demirors et al. ............. 525/71 |

FOREIGN PATENT DOCUMENTS

| | | |
|---|---|---|
| EP | 0 056 123 | 7/1982 |
| EP | 0 172 436 | 2/1986 |
| EP | 0 534 235 | 3/1993 |

OTHER PUBLICATIONS

Database Chemabs 'Online! Chemical Abstracts Service, Columbus, Ohio, USA; Database accession No. 106:33987, XP002190957 & JP–61221225A (Idemitsu Petrochemical Co. Ltd.) abstract.

* cited by examiner

Primary Examiner—Richard D. Lovering
(74) Attorney, Agent, or Firm—Joseph C. Gil; Aron Preis

(57) ABSTRACT

A process for producing a thermoplastic molding composition is disclosed. The process entails introducing a solid polymeric resin, optionally containing residual moisture, into an extruder, operating under conditions designed to melt the resin and charging water into the melt while in the extruder to yield wet, molten resin that contains water in an amount of at least about 2 percent. The wet, molten resin is then devolatilized to yield dry resin having water content not exceeding 0.3 percent. Molding compositions thus produced have improved properties. In a preferred embodiment, the process results in a molding composition that contains a fine dispersion of a discontinuous phase in a continuous polymeric phase.

12 Claims, No Drawings

PROCESS FOR MAKING A THERMOPLASTIC MOLDING COMPOSITION

FIELD OF THE INVENTION

The invention relates to a process for making a thermoplastic molding composition and more particularly to extruding a material system that contains significant amount of water.

SUMMARY OF THE INVENTION

A process for producing a thermoplastic molding composition is disclosed. The process entails introducing a solid polymeric resin, optionally containing residual moisture, into an extruder, operating under conditions designed to melt the resin and charging water into the melt while in the extruder to yield wet, molten resin that contains water in an amount of at least about 2 percent. The wet, molten resin is then devolatilized to yield dry resin having water content not exceeding 0.3 percent. Molding compositions thus produced have improved properties. In a preferred embodiment, the process results in a molding composition that contains a fine dispersion of a discontinuous phase in a continuous polymeric phase.

BACKGROUND OF THE INVENTION

The art has long recognized that some physical properties, notably yellowness index, of a material system, such as a thermoplastic molding composition, deteriorate in the course of extrusion. It is also well recognized that material systems that contain phases that are immiscible one in the other could form fine dispersions upon intensive mixing in the course of extrusion. Some of the mechanical energy imparted to the system in the course of extrusion converts to excess thermal energy that could result in the deterioration of the resin and a corresponding increase in its yellowness index. In practice, those skilled in the art have learned to achieve a compromise between good color and fine dispersion. The inventive process makes it unnecessary to sacrifice good color (low yellowness index) in favor of good dispersion.

Of possible relevance to the present invention is U.S. Pat. No. 5,753,169, where a method for reducing the amount of unreacted unsaturated carboxylic acid or its derivatives from a grafted polyolefin is disclosed. This method entails melt kneading, for instance in an extruder, in the presence of water, a modified polyolefin. The polyolefin is grafted with an ethylenically unsaturated carboxylic acid or of its derivatives. Also noted is U.S. Pat. No. 5,354,804, where a method of emulsifying a thermoplastic resin composition has been disclosed. The process, carried out in an extruder, entails adding water down stream from the melt zone. EP 56123 is noted disclosing the preparation of a molding composition by mixing in the melt a linear saturated polyester and a rubbery graft copolymer. The process includes using a graft copolymer that contains water in an amount of 5 to 50% by weight and requires the polyester to be introduces in melt form.

The present invention resides in the finding that good color and fine dispersion can be attained simultaneously upon the addition of water to a material system in the course of its extrusion.

DETAILED DESCRIPTION OF THE INVENTION

In accordance with the invention, a material system, preferably a thermoplastic molding composition, is produced in a process that includes the following steps:

(i) introducing a solid polymeric resin that may optionally contain residual amount of water into an extruder operating at conditions designed to produce a melt of said polymeric resin;

(ii) introducing an additional quantity of water, preferably water at room temperature, into said melt in an amount calculated to bring the water content of the melt to at least about 2 percent, preferably about 2 to 10, more preferably about 2 to 8 percent, to produce a wet melt; and (iii) devolatilizing said wet melt to produce a dry melt having a water content no greater than 0.3 percent.

The percents, all occurrences, being relative to the weight of the polymeric resin, the polymeric resin of the invention includes no polyolefin that is grafted with ethylenically unsaturated carboxylic acid or its derivatives. The solid polymeric resin introduced in step (i) of the inventive process may contain water in an amount that is preferably lower than 0.8, more preferably lower than 0.5, percent.

The material system produced by the present invention preferably contains at least one polymeric resin as a continuous phase and at least one discontinuous, or dispersed phase that is immiscible in the continuous phase.

Included within the scope of the continuous polymeric resin are virtually any thermoplastic resins. Among these, mention may be made of polyolefins, polystyrenes and copolymers of styrene and/or α-methyl styrene including copolymers with acrylonitrile (SAN). Most preferably, the discontinuous phase includes any of (co)polybutadiene, (co) polyacrylate, styrene-butadiene rubber (SBR), ethylene-propylene (EP) and ethylene-propylene-diene monomer (EPDM) rubbers. Most preferably, the material system includes acrylonitrile-butadiene-styrene (ABS), acrylonitrile-acrylate-styrene (ASA) and acrylonitrile-EPDM-styrene (AES).

The immiscible, discontinuous phase of the material system, may also be an additive or filler, typically an inorganic filler or pigment or gel.

The extruder useful in the practice of the invention is a well-known machine that is widely used in the preparation of thermoplastic molding compositions. It is characterized in that it continuously mixes and kneads the components of a material system material. The preferred extruder is equipped with two or more unidirectionally rotating screws in tight mesh with each other at least in the input zone and the dispersion zone of the device. Extruders have excellent dispersion capabilities and also effect a satisfactory mixing within a narrow spectrum of dwell time within the device. The extruder suitable in the context of the present invention is equipped with means of introducing water. The introduction of water may be carried out at a single point or, in the alternative, at a plurality of points along the extruder Further, the introduction of water is preferably post-flux, that is after the completion of the melting process. The devolatilization is carried out under vacuum vent(s). The operating pressure is at, or less than, atmospheric pressure, preferably at, or less than, 4.0 psia.

The advantages to be attained by the process of the present invention are expressed in terms of low yellowness index and good dispersion of the resulting material system. Yellowness index is determined in accordance with ASTM D 1925. The degree of dispersion in the present context is determined by visual count of the un-dispersed particles that are greater in size (largest dimension) than 0.012 inches that are contained within a 48 square inches area (24 inches in length and 2 inches wide) of a thin (20–25 mils) sheet produced by extrusion in a conventional, single flight, single screw, plasticating extruder.

The invention is further illustrated but is not intended to be limited by the following examples in which all parts and percentages are by weight unless otherwise specified.

The table below summarizes the results of these experiments.

| Example | Q (pph) | N (rpm) | Water @ flux % | water post flux % | DV pressure Psia | SME kWh/kg | Melt Temp °C. | YI | dispersion |
|---|---|---|---|---|---|---|---|---|---|
| 1[a] | 1150 | 440 | 0 | 0 | 4 | 0.1843 | 286 | 42.4 | 21 |
| 2 | 1150 | 440 | 0 | 3 | 4 | 0.1965 | 278 | 40.4 | 11 |
| 3 | 1150 | 440 | 0 | 6 | 4 | 0.1976 | 259 | 38.7 | 8 |
| 4[a] | 1350 | 610 | 0 | 0 | 3 | 0.2001 | 305 | 45.3 | 62 |
| 5[a] | 1350 | 610 | 0 | 3 | 6 | 0.2086 | 282 | 41.8 | 9 |
| 6[a] | 1350 | 610 | 0 | 6 | 3 | 0.2151 | 268 | 40.3 | 8 |
| 7 | 1350 | 710 | 0 | 0 | 3 | 0.2109 | 301 | 46.6 | 36 |
| 8[a] | 1350 | 710 | 0 | 6 | 8 | 0.22 | 274 | 40.8 | 5 |
| 9[a] | 1350 | 610 | 0 | 0 | 3 | 0.2066 | 294 | 42.3 | 17 |
| 10 | 1350 | 610 | 3 | 3 | 6 | 0.2177 | 266 | 37.5 | 6 |

| Example | Q (pph) | N (rpm) | Water @ flux % | water post flux % | DV pressure Psia | SME kWh/kg | Melt Temp °C. | YI | dispersion |
|---|---|---|---|---|---|---|---|---|---|
| 11* | 324 | 176 | 0 | 0 | 1 | 0.1793 | 272 | 42.1 | 3 |
| 12* | 324 | 176 | 0 | 2.3 | 1 | 0.1865 | 264 | 40.9 | 2 |
| 13 | 648 | 350 | 0 | 0 | 1 | 0.1904 | 279 | 41.6 | 9 |
| 14 | 648 | 350 | 1.9 | 3.9 | 1 | 0.2043 | 263 | 38.5 | 2 |
| 15[a] | 648 | 350 | 3.9 | 1.9 | 1.5 | 0.2 | 264 | 36.1 | 3 |
| 16 | 648 | 350 | 0 | 0 | 1 | 0.2067 | 286 | 44.2 | 4 |
| 17[a] | 648 | 350 | 5.7 | 0 | 1 | 0.2223 | 267 | 41.4 | 4 |
| 18 | 648 | 350 | 2.7 | 5.5 | 1.5 | 0.2344 | 264 | 41.5 | 1 |

*screen pack 20/40/100/40/20 was used for Examples 11 and 12
[a]-the values represent averages of two runs.

EXAMPLES

Experimental

Thermoplastic molding compositions were prepared in accordance with the inventive process as described below. In carrying out the experiments, the continuous phase used was a copolymer of styrene and acrylonitrile (SAN).

The immiscible, discontinuous phase was a copolymer of butadiene and acrylonitrile, (poly[butadiene-co-acrylonitrile] rubber). The amount of water introduced varied as noted in the table below and the points of introduction of water are also noted. Extrusions were carried out using in each case a co-rotating, intermeshing twin screw extruder. The processing parameters used in the course of preparing these examples were as follows: the temperature of the extruder barrel was controlled at 205° C., +/−15° C.; the throughput rate of the resinous material was (Q) is in the table in pounds per hour; the extrusion screws were operated at, (N), the number of revolutions per minutes (rpm); the amount of water added into process is noted in the table as % based upon Q; water was metered into the process, under positive pressure, at the indicated locations: "@ flux" denotes the location where solid feedstock converts into molten mass and "post flux" denotes a location down stream therefrom; in some of the experiments water was added at both locations. The pressure at the devolatilization stage of the process is shown in the table as P; and the use of screen pack is noted as well. The dispersion values are actual count of un-dispersed particles and the DV pressure is given in Psia; SME denotes specific mechanical energy in kWh/kg imparted to the extrudate.

The results clearly demonstrate the advantageous properties of the product produced by the inventive process. While normally, the entire input of mechanical energy converts into thermal energy, and such conversion results in the deterioration of the resin and increased yellowness index (YI), the inventive process results in better dispersion—expressed in terms of lower count of un-dispersed large particles and lowered YI values.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a thermoplastic molding composition comprising (i) introducing solid material system into an extruder operating at conditions designed to produce a melt of said material system, (ii) introducing an amount of water into said melt in an amount calculated to bring the water content of said melt to a level greater than about 2 percent, to produce a wet melt, and (iii) devolatilizing said wet melt to produce a dry melt, said dry melt having water content no greater than 0.3 percent, said percent, all occurrences, being relative to the weight of said material system, polyolefin that is grafted with ethylenically unsaturated carboxylic acid or its derivatives being excluded from said material system, said material system containing at least one polymeric continuous phase and at least one discontinuous phase that is immiscible in said continuous phase said discontinuous phase being at least one member selected from the group consisting of (co)polybutadiene, (co)polyacrylate, SBR, EP rubber and EPDM rubber.

2. The process of claim 1 wherein the continuous polymeric phase comprise at least one member selected from the group consisting of (co)polyolefin and (co)polystyrene.

3. The process of claim 1 wherein the continuous polymeric phase comprise copolymer of styrene and/or α-methyl styrene with acrylonitrile.

4. The process of claim 1 wherein the discontinuous phase comprises at least one member selected from the group consisting of a conventional functional additive.

5. The dry melt produced by the process of claim 1.

6. The process of claim 1 wherein the solid material system introduced in (i) has a water content of less than 0.8 percent.

7. The process of claim 1 wherein the solid material system introduced in (i) has a water content of less than 0.5 percent.

8. The process of claim 1 wherein the amount of water introduced into said melt in said (ii) is 2 to 8 percent.

9. The process of claim 1 wherein the extruder is a twin screw extruder.

10. The process of claim 9 wherein the dry melt contains water in an amount less than 0.3%.

11. The process of claim 1 wherein the material system comprises at least one member selected from the group consisting of acrylonitrile-butadiene-styrene (ABS), acrylonitrile-acrylate-styrene (ASA) and acrylonitrile-EPDM-styrene (AES).

12. The dry melt produced by the process of claim 11.

* * * * *